Sept. 5, 1944.                H. P. KUEHNI                 2,357,666

THICKNESS GAUGE

Filed Jan. 19, 1943

Inventor:
Hans P. Kuehni,
by Harry E. Dunham
His Attorney.

Patented Sept. 5, 1944

2,357,666

UNITED STATES PATENT OFFICE 2,357,666

THICKNESS GAUGE

Hans P. Kuehni, Schenectady, N. Y., assignor to General Electric Company, a corporation of New York Application January 19, 1943, Serial No. 472,841

1 Claim. (Cl. 175—183)

My invention relates to a gauge for determining the thickness of magnetic sheet material and its object is to provide a reliable, nondestructive gauge for sheet magnetic material which may be made portable and used from one side of the sheet material being tested.

Figure 1:
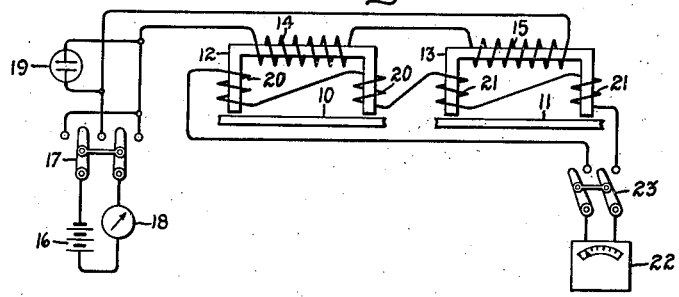
Figure 2:
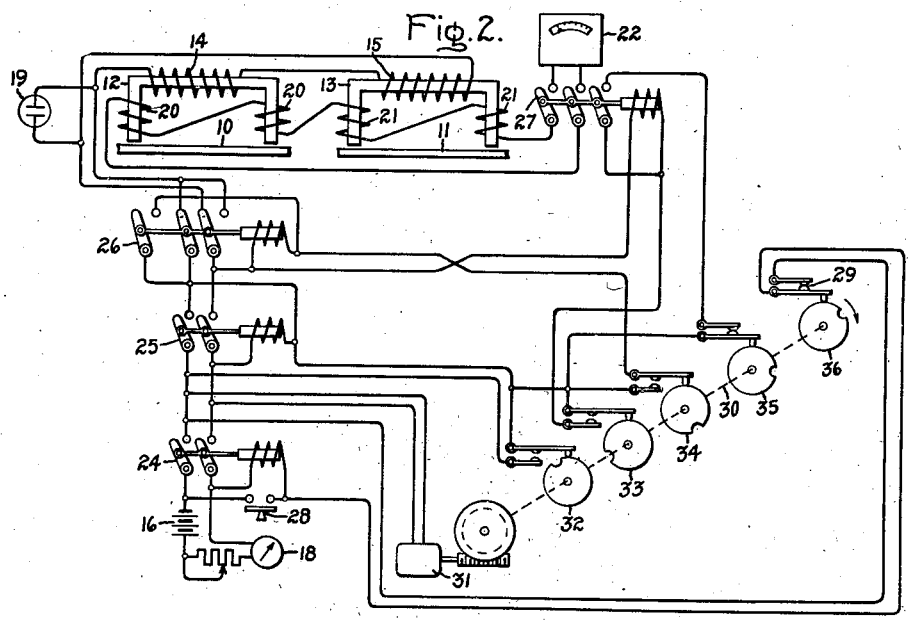

The features of my invention which are believed to be novel and patentable will be pointed out in the claims appended hereto. For a better understanding of my invention, reference is made in the following description to the accompanying drawing in which Fig. 1 represents a gauge circuit system embodying my invention where sheets of known and unknown thickness are compared by saturating both with electromagnets and comparing the magnetomotive force stored in the two by means of a ballistic galvanometer calibrated in terms of thickness. In Fig. 1 the magnetizing circuit and ballistic galvanometer circuits are provided with manual switches. Fig. 2 represents the same type of system as in Fig. 1 except that the switches are automatically controlled in a selected sequence primarily in the interests of quick and systematic operation avoiding waste of energy and avoiding overheating of the magnetizing coils; and in Fig. 3 I have represented an embodiment of the invention employing a permanent magnet as the flux producing source.

Referring now to Fig. 1, 10 may be taken to represent a sheet of magnetic material of known thickness, say three-eighths of an inch in thickness, and 11 represents a sheet of similar material but of unknown thickness and the apparatus is employed to determine the thickness of sheet 11. For similarly magnetizing a section of each sheet, I provide magnetic yokes 12 and 13 having direct current magnetizing coils 14 and 15. These coils are adapted to be connected to a direct current source of supply 16 through a reversing switch 17. An ammeter 18 may be included in the circuit and a glow tube 19 is preferably connected across the circuit to absorb the transient voltage incident to the switching operations to be described. The yokes 12 and 13 are placed against the standard sheet 10 and the sheet 11 of unknown thickness so that the sheets close or substantially close the magnetic circuits of the respective yokes. If the sheet 11 to be tested has a coating of paint or the like so as to provide an air gap between it and the yoke, a similar air gap will be provided between yoke 12 and sheet 10 although exact matching of the air gaps, if any, is not critical because of the low amount of magnetic energy stored therein.

Now when the switch 17 is closed, the yokes and sheets 10 and 11 will be magnetized and the ampere turns and yoke sections should be sufficient to saturate the sheet sections. The yokes are similar and when thus energized, a certain amount of magnetic energy is stored in each magnetic circuit. If the sheets 10 and 11 are of the same thickness, the energy stored in the two magnetic circuits will be equal. However, if sheet 11 is thicker or thinner than sheet 10, more or less energy will be stored in the magnetic circuit of which yoke 13 is a part. In order to measure the difference in the energy thus stored, I provide secondary or pickup windings 20 and 21 on the two yokes. These windings are similar and are connected in series in bucking relation to a ballistic galvanometer 22 through a switch 23. It is immaterial whether the primary windings 14 and 15 are connected in reverse relation or the secondary windings 20 and 21 are connected in reversed relation to provide the differential bucking arrangement.

Assuming now that switches 17 and 23 are closed, the opening of switch 17 will release the stored magnetic energy, and voltages corresponding to such released energy will be induced in the secondary windings 20 and 21, and the difference between these voltages will be conveyed to instrument 22 and produce a deflection proportional to the difference in the magnetic energy stored in the two systems. The indication can be doubled by reversing the switch 17.

When the switch 17 is reversed in one direction, the pointer of the galvanometer will be kicked in one direction and when reversed in the opposite direction, it will be kicked in the opposite direction a distance proportional to the difference in thickness, if any, of the sheets 10 and 11, and by trial the relative direction of galvanometer deflection, when 11 is thicker or thinner than the standard 10, may be ascertained. The galvanometer may then be calibrated in suitable thickness units or in percentage thickness of the standard. The energy stored in the magnetic circuits is that of the yokes, the air gaps, if any, and in the saturated sheet sections. Since that stored in the yokes and air gaps is made equal, the difference is that due to the difference in thickness of the sheets 10 and 11.

An important aspect of this invention is that most sheet steel materials used in industry have very closely the same saturation point although the saturation curves below saturation may be quite different. This is true of the various silicon sheet steels. Of course materials should be used at 10 and 11 which have the same or approximately the same saturation point, or allowance made therefor. It follows that materials of the same thickness but having materially different saturation points may be sorted by the apparatus. It will be evident that the wires leading to magnetic core structure 13 may be grouped into a flexible cable so as to be carried about and moved relative to the remaining apparatus, or the entire apparatus may be readily made in portable form.

In Fig. 2 I have provided automatic means for operating the switching arrangement with a view to saving energy, quickness and proper sequence of operation, and preventing overheating of the energizing coils. Those parts which are similar to those of Fig. 1 are identified by similar reference characters. Four relay operated switches 24, 25, 26, and 27 are shown which are normally biased to the positions shown and moved to the right when their operating coils are energized. The coil of switch 24 is energized through a push button 28. The remaining switch operating coils are energized through the contacts of a cam controller 30 driven by a motor 31. The direction of rotation of the cams of the controller is indicated by the arrow opposite cam 36. Cams 32, 33, and 34 close the coils of switches 25, 27, and 26 respectively. Cam 35 controls a holding circuit for the energizing coil of switch 27, and cam 36 controls a holding circuit for the energizing coil of switch 24. During a thickness measuring operation the several cams operate their respective contacts in the order in which the cams are numbered.

With the apparatus in the position shown, a testing operation is initiated by closing push button switch 28. This closes switch 24 and energizes motor 31 which starts. A holding circuit for the coil of switch 24 is thus established through switch 24 and the contacts of cam 36. Motor 31 starts and closes the circuit of the operating coil of switch 25 through the contacts operated by cam 32. Closure of switch 25 establishes its own holding circuit and energizes the primary windings 14 and 15 through switch 26 in the position as shown. The contacts of cam 33 next close, energizing the coil of switch 27 which closes to connect galvanometer 22 to the secondary coils 20 and 21. Closure of switch 27 also closes its own holding circuit through the contacts opposite cam 35. The contacts of cam 34 next close, energizing the coil of switch 26 thereby reversing the direction of current flow through primary windings 14 and 16 and also establishing a holding circuit for switch 26. As switch 26 reverses, the galvanometer 22 is deflected in accordance with any difference in the thickness of plates 10 and 11. Cam 35 next opens its contacts, deenergizing the coil of switch 27 and this switch opens. Finally, cam 36 opens its contacts, deenergizing the coil of switch 24 which opens, deenergizing the coils of switches 25 and 26 and motor 31. The controller then stops in about the position shown and with all switches in the position shown. The operator may then transfer the yoke 13 to the next sheet or part to be tested and repeat the testing operation by merely pushing button 28 momentarily and reading the galvanometer 22.

Figure 3:
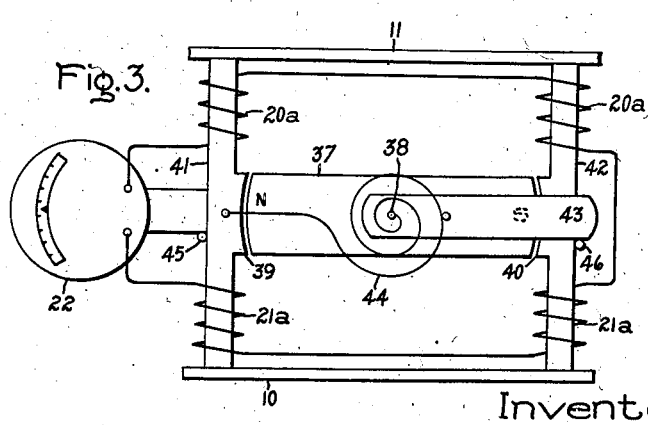

In Fig. 3 I have represented a modification of my invention where the testing flux is produced by a permanent magnet 37. This magnet is pivoted at 38 at its center so as to be reversed between pole pieces 39 and 40 of the parallel magnetic circuit, comprising magnetic yoke sections 41 and 42 and the standard sample 10 and the sheet 11 to be tested. With the magnet armature 37 in the position shown, flux from its north pole enters pole piece 39 and divides, part going up through the upper branch of yoke 41, through test piece 11, down through the upper branch of yoke 42 to pole piece 40, back to the south pole of the magnet 37. The remainder of the flux follows the parallel path through the lower branches of yokes 41 and 42 across standard sample sheet 10. Magnet 37 should be of sufficient capacity and strength, after stabilized knockdown, to force sufficient flux across the air gap and through the parallel magnetic circuits to saturate the sheet sections 10 and 11. The air gap opposite the ends of the magnet 37 are made as small as practicable. The flux will divide between the two paths in relation to the thickness ratio of the sheet sections 10 and 11, since the two flux paths are otherwise made identical. To obtain a double measurement of the difference in the stored magnetic energy in the two magnet circuits, the magnet is made reversible and is provided with a handle 43 and a spring 44 to facilitate reversing. Positioning stops 45 and 46 are provided to stop the handle in the two reversing positions. To operate, the handle is swung counterclockwise from the position shown against stop 45. This tensions the spring 44. The handle is then released and the magnet reverses its position between the pole pieces 39 and 40 to reverse the direction of flux through the parallel magnetic circuits. The yoke sections are provided with secondary windings 20a and 21a corresponding to the windings 20 and 21 of Figs. 1 and 2. Winding 20a is connected bucking with respect to winding 21a in series with the ballistic galvanometer 22 which may be supported on the magnetic structure as shown. The standard sample 10 may be secured in place by clamps or otherwise, and used as a handle for the apparatus. This modification which does not require the direct current energizing source, connections, and switches, is especially suitable for portable work. For example, it may become desirable to examine a steel smokestack or large tank to see if the thickness of the sheet steel used is not becoming too thin due to rust or other cause. A workman can carry the thickness testing apparatus with him up a ladder, for example, and obtain a close approximation of the thickness of a steel smokestack at various points from the outside. Where the sheet material to be examined has a curved surface, the contacting surfaces of the yoke portion may be curved accordingly to obtain an approximate fit.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

Apparatus for testing sheet magnetic material comprising a magnetizing structure having magnetic yoke sections forming two sets of pole pieces across which similar lengths of sheet magnetic material may be placed for comparative test purposes, a permanent magnet forming a parallel flux path for and producing fluxes in said yoke sections between both sets of pole pieces sufficient to cause saturation in such sheet magnetic material, said parallel flux paths being similar except for any difference caused by differences in such sheet material, said permanent magnet being pivoted between said yoke sections so as to be reversible to simultaneously reverse the direction of flux in the two parallel flux paths, a spring for rotating said permanent magnet in one direction in a reversing operation, means for stopping rotation of said permanent magnet in yoke magnetizing position when so reversed, similar secondary windings on the yoke section of each parallel magnetic path, a ballistic galvanometer, and means for connecting said secondary windings in series bucking relation to said galvanometer.

HANS P. KUEHNI.